L. D. PELTON & J. BARROW.
CULTIVATOR.
No. 65,938. Patented June 18, 1867.
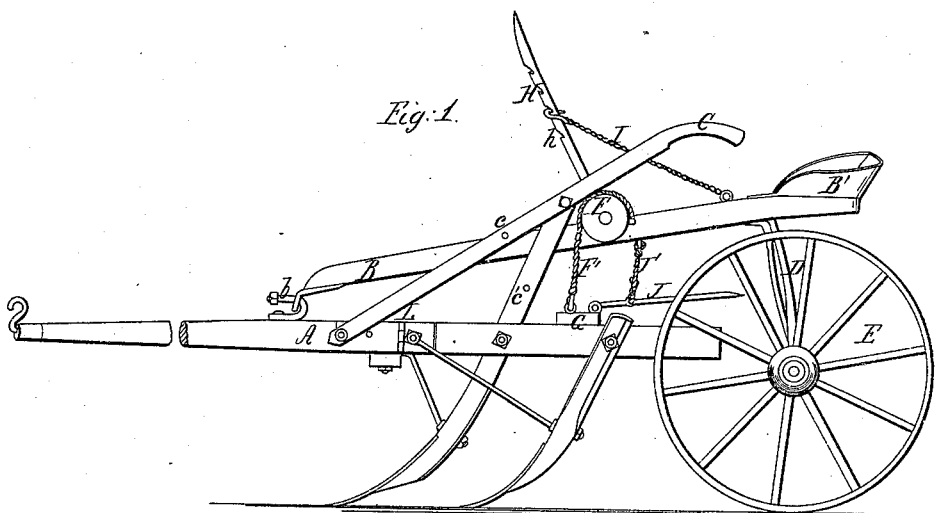
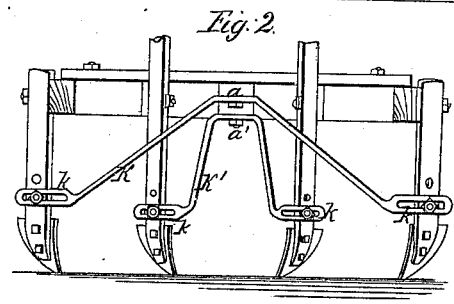

United States Patent Office.

LORENZO D. PELTON AND JOSEPH BARROW, OF HARRISON, OHIO, ASSIGNORS TO THEMSELVES AND ALEXIS GREEN, OF THE SAME PLACE.

*Letters Patent No. 65,938, dated June 18, 1867.*

IMPROVEMENT IN CULTIVATORS.

*The Schedule referred to in these Letters Patent and making part of the same.*

TO WHOM IT MAY CONCERN:

Be it known that we, LORENZO D. PELTON and JOSEPH BARROW, both of Harrison, in the county of Hamilton, and State of Ohio, have invented a new and useful Cultivator; and we hereby declare the following to be a full, clear, and exact description thereof, reference being had to the accompanying drawings, making part of this specification.

The object of this invention is to provide a cultivator admitting of the attachment or removal of the wheels and driver's seat, and admitting of guidance of the ploughs or shares by means of the handles in either form. In the accompanying drawings—

Figure 1 is a side elevation of a machine embodying our invention; and

Figure 2 is a rear view of the cultivator proper.

A is the main beam of the cultivator, running forward in a tongue, B, a secondary beam attached to a hooked bolt, $b$, traversing beam A. The beam B passes backward, rising at a slight angle between the handles C, and is supported in rear of the cultivator upon the bent axle D of a pair of wheels, E. This beam supports a driver's seat, B', in such a position as to enable the driver to reach and manage the plough-handles. A pair of pulleys, F, on the beam B are connected by cords F' to the cross-bar G of the cultivator, and, being revolved by a lever, H, raise the ploughs from the surface of the ground; and a chain and hook, I, engaging in notches $h$ in this lever, serve to hold it to any desired position when the machine is travelling from place to place. Another lever, J, is attached to the cross-bar G; and a cord or chain, J', suspended from the beam B, serves as a fulcrum, so that by depressing the lever the ploughs are raised slightly to avoid a stone, root, or other obstacle. This lever is shown somewhat depressed in the drawing.

Another prominent feature of our invention consists in a mode of construction whereby the wheels may be detached by removing the secondary beam B, and the implement guided by a man on foot. Auxiliary bolt-holes $c$ in the handles, and $c'$ in the sheths, allow the handles to be depressed to the convenient height for this purpose. Bolted to the beam A at $a$ and $a'$ are braces K K', connecting the lower part of the sheths to the said beam; and these braces have slots $k$ for the lateral adjustment of the ploughs, whose beams are hinged at L to the beam A.

We claim herein as new, and of our invention—

1. A mode of construction whereby the wheels and secondary beam B may be detached, and, by means of auxiliary bolt-holes $c$ in the handles C, and in the sheths at $c'$, the handles lowered to a convenient height to be managed by an operator on foot.

2. In combination with the elements of the clause immediately preceding, we claim the provision of the described mechanism for lifting the ploughs from the ground, either temporarily to pass an obstacle, J J', or more permanently to allow of moving the implement on a road or otherwise, F, F', H, $h$, and I, and the position of the seat, which enables the driver to control these levers and manage the plough-handles.

In testimony of which invention we hereunto set our hands.

LORENZO D. PELTON,
JOSEPH BARROW.

Witnesses:
GEO. H. KNIGHT,
JAMES H. LAYMAN.